UNITED STATES PATENT OFFICE.

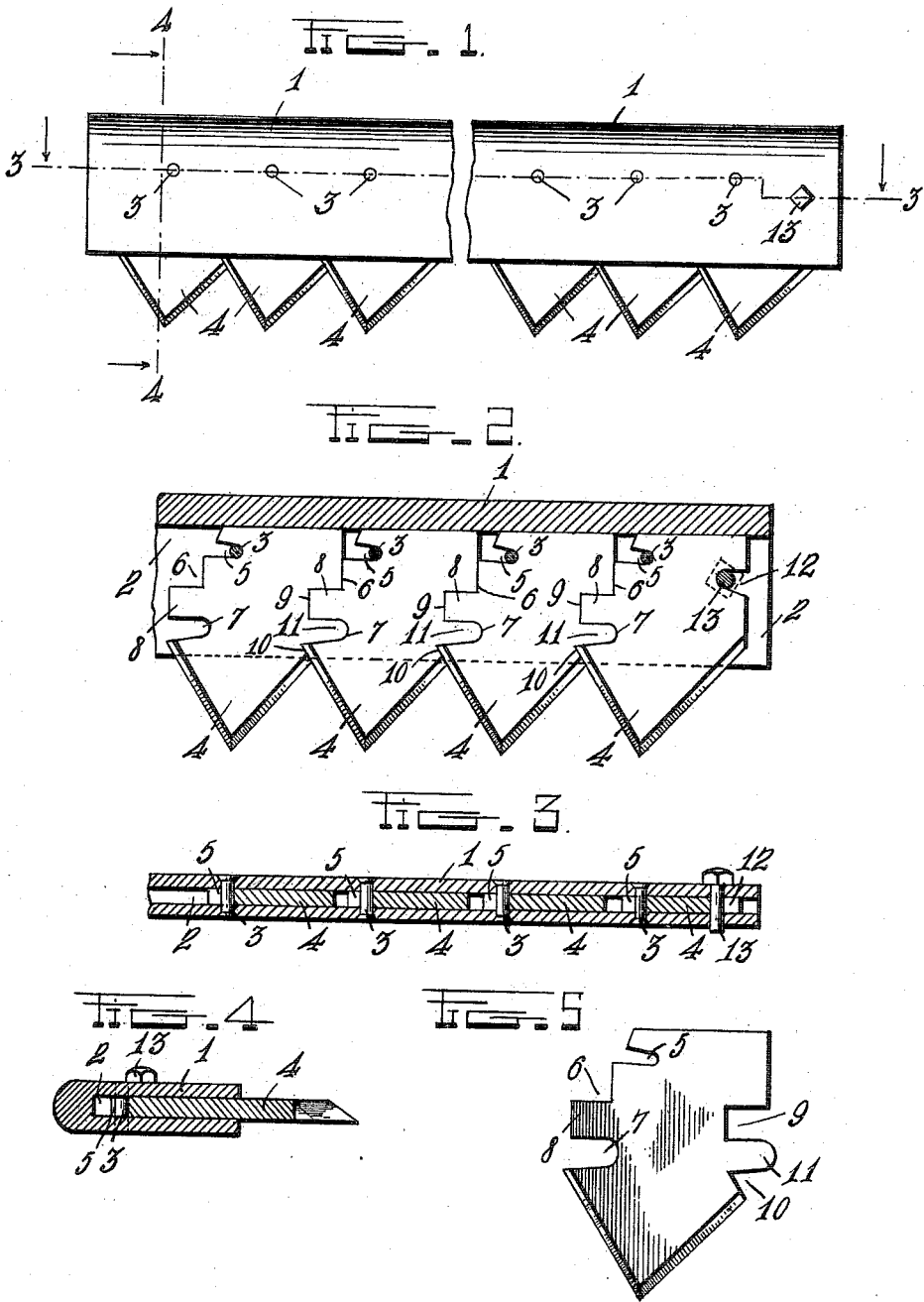

HENRY SMITH AND ROBERT WHITFIELD, OF THOMASVILLE, GEORGIA.

CUTTER-BAR.

985,948.

Specification of Letters Patent.

Patented Mar. 7, 1911.

Application filed December 17, 1909. Serial No. 533,602.

*To all whom it may concern:*

Be it known that we, HENRY SMITH and ROBERT WHITFIELD, citizens of the United States, residing at Thomasville, in the county of Thomas and State of Georgia, have invented certain new and useful Improvements in Cutter-Bars; and we do declare the following to be a full, clear, and exact description of the invention, such as will enable others skilled in the art to which it appertains to make and use the same.

This invention relates to improvements in cutter bars for harvesting machines, mowing machines and the like.

The object of the invention is to provide a cutter bar having an improved means for detachably securing the blades or cutters to the bar, whereby should any of the blades become broken they may be quickly and easily removed and replaced by a new blade or cutter.

With the foregoing and other objects in view, the invention consists of certain novel features of construction, combination and arrangement of parts, as will be more fully described and particularly pointed out in the appended claim.

In the accompanying drawings, Figure 1 is a plan view of a cutter bar constructed in accordance with the invention; Fig. 2 is an enlarged horizontal section through a portion of the bar taken immediately above the cutters; Fig. 3 is a vertical longitudinal section on the line 3—3 of Fig. 1; Fig. 4 is a cross sectional view on the line 4—4 of Fig. 1, and, Fig. 5 is a plan view of one of the cutters or blades.

Referring more particularly to the drawings, 1 denotes the cutter bar in which is formed a horizontally disposed groove or channel 2 which opens through the front edge of the bar and extends back to near the rear edge thereof as shown. In the bar adjacent to the rear wall of the groove or channel 2 is arranged a series of vertically disposed cutter retaining pins 3, the ends of which are upset or riveted in the opposite sides of the bar as shown. Between the pins 3 and engaged therewith is arranged a series of cutters or blades 4, the outer cutting portion of which is of the usual V-shaped construction, and projects beyond the front edge of the bar as shown. The engaging edges of the cutters 4 have formed therein interlocking notches and projections whereby they are locked into engagement with each other to hold the same in position on the cutter bar. On one edge of the cutters adjacent to their inner ends is formed a pin engaging notch 5 which is preferably formed at a slight angle with respect to the inner end of the cutter, whereby when the notch is engaged with one of the pins 3, the cutter will be drawn back into position against the rear wall of the groove 2 in the bar. At the outer end of the notch 5 is formed a shoulder 6 which is adapted to engage the adjacent edge of the adjoining cutter and below said shoulder 6 is formed another notch 7, between which and the shoulder 6 is formed a tongue 8. In the opposite edge of the cutter is formed a recess 9 arranged in longitudinal alinement with the tongue 8 and below said recess and the notch 9, is formed a tongue 11 arranged in longitudinal alinement with the recess 7 in the other edge of the tooth. Below the tongue 11 is formed a notch 10 to receive a pointed projection 7' on the other edge of the adjacent tooth.

In assembling the cutters, the edge of one of them containing the shoulders, tongues, notches and points 6, 7, 8 and 7' is engaged with the edge of the adjacent cutter having the recesses, tongues, and notches 9, 11 and 10, and said notched and recessed portions are engaged with each other to form an interlocking connection between the cutters as clearly shown in Fig. 2 of the drawings.

It will be noted that the cutters or blades are all constructed alike in the manner described, except the last cutter at the outer end of the bar and that this cutter is provided on its outer edge with a single notch 12 which is adapted to be engaged by a removable bolt 13 which forms the key for retaining the entire series of cutters in position.

By constructing the cutters and the cutter bar and arranging the same as herein shown and described, the cutters will be securely held in operative engagement with the bar by the key bolt 13 so that should any one of the cutters be broken, the same may be readily removed by first removing the key bolt and then slipping the cutters along in the bar and out of engagement with the broken cutter, thereby permitting the ready removal of the same and the insertion in place thereof of a new cutter.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described our invention, what we claim is:—

A cutter bar provided with a plurality of separably connected teeth intermeshing at their adjacent edges, each of which is provided on one side edge with a tongue extending longitudinally therefrom intermediately of its ends with a recess arranged on one side of said tongue and a shoulder at the base of its other side, said edge having a pin engaging notch extending laterally between said shoulder and the rear end of said tooth, the rear wall of said recess being inclined forwardly to exert a binding effect on the pin to be engaged, a projection between the front edge of the tooth and said tongue, the other side edge of said tooth having a recess arrangement in longitudinal alinement with the tongue at the opposite edge and having a notch on one side and a recess on the other for interlocking engagement with the tongue, recess and projection of the adjacent tooth.

In testimony whereof we have hereunto set our hands in presence of two subscribing witnesses.

HENRY SMITH.
ROBERT WHITFIELD.

Witnesses:
W. O. PALIN,
B. H. WRIGHT.

Copies of this patent may be obtained for five cents each, by addressing the "Commissioner of Patents, Washington, D. C."